United States Patent [19]
Dickie et al.

[11] Patent Number: 5,753,983
[45] Date of Patent: May 19, 1998

[54] MULTI-FUNCTION CONTROL SWITCH FOR ELECTRICALLY OPERATING DEVICES

[75] Inventors: Robert G. Dickie, Newmarket; Thomas K. Tierney, Schomberg; Michael E. Coveley, Thornhill, all of Canada

[73] Assignee: 1012384 Ontario, Inc., Ontario, Canada

[21] Appl. No.: 513,042

[22] Filed: Aug. 9, 1995

Related U.S. Application Data

[63] Continuation-in-part of Ser. No. 310,320, Sep. 22, 1994, Pat. No. 5,586,098, which is a continuation-in-part of Ser. No. 898,307, Jun. 16, 1992, abandoned.

[51] Int. Cl.$^6$ .................... K01H 3/34; G05B 11/01
[52] U.S. Cl. .............. 307/141.4; 307/125; 307/139; 315/159; 304/141; 304/143
[58] Field of Search .................. 307/112, 125, 307/138, 139, 140, 141, 141.4, 141.8; 364/141, 142, 143, 144, 145; 315/307, 150, 151, 158, 159

[56] References Cited

U.S. PATENT DOCUMENTS

| 2,860,212 | 11/1958 | Stern | 200/159 |
|---|---|---|---|
| 3,772,484 | 11/1973 | Roeser | 200/4 |
| 4,172,973 | 10/1979 | Sano | 200/315 |
| 4,338,562 | 7/1982 | Terwilliger | 323/323 |
| 4,339,696 | 7/1982 | Jabor | 315/360 |
| 4,379,237 | 4/1983 | Mosteller, Jr. | 307/141 |
| 4,379,973 | 4/1983 | Turner et al. | 307/112 |
| 4,429,200 | 1/1984 | Glenn et al. | 200/153 T |
| 4,540,984 | 9/1985 | Waldman | 340/825 |
| 4,570,216 | 2/1986 | Chan | 264/143 |
| 4,572,963 | 2/1986 | Nakano et al. | 307/38 |
| 4,575,659 | 3/1986 | Pezzolo et al. | |
| 4,649,323 | 3/1987 | Pearlman et al. | |
| 4,668,878 | 5/1987 | Wyss | 307/141 |
| 4,672,232 | 6/1987 | Schoen | 307/140 |
| 4,695,739 | 9/1987 | Pierce | |
| 4,703,171 | 10/1987 | Kahl et al. | |
| 4,719,363 | 1/1988 | Gallacher | |
| 4,924,109 | 5/1990 | Weber | 307/126 |
| 4,937,702 | 6/1990 | Kurihara | |
| 5,003,192 | 3/1991 | Beigel | 307/140 |
| 5,051,607 | 9/1991 | Dalton | 307/141 |
| 5,053,591 | 10/1991 | Theurer | 200/315 |

(List continued on next page.)

FOREIGN PATENT DOCUMENTS

| 0 119 187 | 9/1984 | European Pat. Off. |
| 0 581 555 | 2/1994 | European Pat. Off. |
| 2 618 233 | 7/1987 | France |
| 2 618 233 | 1/1989 | France |
| 7208445 U | 7/1972 | Germany |
| 4022514 A1 | 1/1992 | Germany |
| 43 12 614 | 10/1994 | Germany |
| 2 181 899 | 4/1987 | United Kingdom |
| WO 81/02808 | 10/1981 | WIPO |
| WO 91/08606 | 6/1991 | WIPO |
| WO 95/01645 | 1/1995 | WIPO |

Primary Examiner—Jonathan Wysocki
Assistant Examiner—Jonathan S. Kaplan
Attorney, Agent, or Firm—Sterne, Kessler, Goldstein & Fox P.L.L.C.

[57] ABSTRACT

A multi-function control switch for electrically operating devices, such as a lighting system, is disclosed. The multi-function control switch includes a rocker-type actuating arm for actuating a plurality of momentary switches. When actuated, the momentary switches send signals to an electronic operating module which houses a control logic circuit. The control logic circuit receives input keying sequences from the user, and interprets the input to determines whether the input keying sequence is associated with any of the command logic elements stored in its memory, and whether the system may validly switch from the current operating function to the new operating function. If the transition is valid, the control logic circuit signals the electronic operating module to execute the command logic element associated with the new operating function.

42 Claims, 7 Drawing Sheets

U.S. PATENT DOCUMENTS

| | | | |
|---|---|---|---|
| 5,095,409 | 3/1992 | Dematteo et al. | 302/23 |
| 5,099,193 | 3/1992 | Moseley et al. | |
| 5,128,654 | 7/1992 | Griffin et al. | |
| 5,130,613 | 7/1992 | Szuba . | |
| 5,160,853 | 11/1992 | Simon et al. | 307/140 |
| 5,189,393 | 2/1993 | Hu . | |
| 5,194,781 | 3/1993 | Konopka | 315/291 |
| 5,227,762 | 7/1993 | Guidette et al. | |
| 5,290,983 | 3/1994 | Roberts et al. | 200/557 |
| 5,293,097 | 3/1994 | Elwell . | |
| 5,349,330 | 9/1994 | Diong et al. | 340/567 |
| 5,386,210 | 1/1995 | Lee . | |
| 5,445,539 | 8/1995 | Dale | 439/535 |
| 5,463,286 | 10/1995 | D'Aleo et al. | 315/295 |
| 5,481,452 | 1/1996 | Simmons | 364/141 |

MULTI-FUNCTION CONTROL SWITCH FOR ELECTRICALLY OPERATING DEVICES

CROSS-REFERENCE TO RELATED APPLICATIONS

This is a continuation-in-part of application Ser. No. 08/310,320, filed on Sep. 22, 1994, now U.S. Pat. No. 5,586,048, which is a continuation-in-part of application Ser. No. 07/898,307, filed on Jun. 16, 1992, now abandoned.

BACKGROUND OF THE INVENTION

1. Field of the Invention

The present invention relates to a multi-function control switch for electrically operating devices such as lighting fixtures, table lamps, or other appliances. In particular, the present invention provides a multi-function control switch which may be mounted in a standard wall junction box, and which controls a variety of functions affecting the electrical devices to which it is connected.

2. Related Art

The most elementary types of electrical control switches for electrical lamps and other electrical operating devices support two basic operating functions, "power on" and "power off". For example, a two-position wall switch may simply turn on or off the power for room lighting fixtures. New and more-advanced control switches often provide a number of additional operating functions, including dimmers, timers, energy saving shut off devices and automatic sensors. These operating functions require additional controls by which a user can select, initiate or program these functions. Further, advanced control switches often provide means by which the status of the operating functions is indicated to the user.

For example, the dimming function in a conventional lighting system is often effectuated by means of a voltage divider or a rheostat. The dimming function is often controlled by using a slide or rotary switch or rheostat mechanism to directly control the output voltage supplied to the lighting device. Thus, a conventional system requires either a dial or a sliding switch to adjust illumination of the lights. In other systems, dimming is accomplished by means of a fast-operating solid state switch or a silicon-controlled rectifier which turns on and off at various points during each cycle of the alternating circuit being fed to the lighting device. In either system, addition of a dimming function to an on/off switch requires the addition of more-advanced controls by which the user can operate this function.

The timing function in a conventional lighting system turns the lights on and off according to a programmed or random pattern. Programmed timers are often employed for the convenience of the user, so as to have the lights or other appliances operate or deactivate at preset times. In order to program a multi-function control switch for such an operating function, conventional systems use controls such as small timing pegs which are physically positioned by the user around a timing wheel wherein one full cycle typically represents a full day. The user positions the timing pegs to indicate the time of programmed power on or off. In other applications, an electrical timer is programmed with the time of day and with the time and duration of the power on and off events. Thus, addition of a timing function to an on/off switch requires the addition of often complicated controls.

Random timers are typically used for security purposes so as to give an appearance to an observer that a residence or office building is occupied to deter intruders. Random timers usually require less initiation and/or programming by the user than programmed timers. However, the user must still engage this function using an additional control mechanism, and the system must by some means indicate to the user that initiation was successful.

However, as the control switch's complexity and number of features increase, it typically becomes more difficult for the user to operate the control switch properly and to take full advantage of its features.

All multi-function control switches face the problem of current overload, which can, for example, occur if the user plugs too many lights or appliances into an outlet fixture controlled by the switch. Mechanical wall switches are typically protected by a central fuse or circuit-breaker panel, and are rated to handle the same current load as the fuse. However, multi-function control switches generally have a lower current rating than mechanical switches, and so they may not be adequately protected by the fusing customarily used in the central panel. Thus, if too much current runs through the multi-function circuit, a system failure will occur. Then, depending on the design, the user either must physically replace an internal fuse in the multi-function control switch, or must replace the entire unit, due to the damage caused by the current overload. Replacing an internal fuse is a safety hazard to the user, as is replacing the entire unit. Thus, a method is needed to protect the system from damage during current overload situations which avoids the need for servicing or replacement of the multi-function control switch, or alteration of the central fuse panel.

Power failures pose a further problem for multi-function control switches which electronically store either user instructions or preferred settings. For example, if the user programs a sequence into the control switch to turn on and off the lights at specific times, a power failure would typically erase this information from the switch's memory. Even short power failures, which are quite common, will erase any stored settings or instructions unless a method has been employed to save the settings or instructions. Some multi-function control switches utilize a replaceable battery to prevent erasure of stored information during power failures. However, batteries are an additional expense to the user, and if not serviced for a long period of time, they may become corroded. Battery corrosion poses a safety hazard in any device which controls high-voltage current. Other rechargeable solutions exist, but they require a significant additional cost. A method is needed to inexpensively and efficiently protect user instructions and preferred settings, at least during short power failures, without requiring periodic service by the user.

Regulatory agencies in many countries require that the design of a multi-function control switch must incorporate the ability to physically disconnect the switch from the power source. Thus, most multi-function control switches employ an air-gap power switch mechanism which allows the user to effect disconnection. While this is a commendable safety feature, it also presents an additional cost to the design of the multi-function control switch. It is therefore desirable to design a multi-function control switch which incorporates this mandatory auxiliary control in an inexpensive and efficient manner.

Some multi-function control switches include sensing functions which automatically sense occupancy within a room by way of remote sensors such as passive infrared sensors, sound sensors, or other such devices. In response to the triggering of these sensors, these multi-function control switches can turn on the lighting in a room, maintaining it for at least a fixed duration of time after the time of the most recent triggering. In some cases, several of these sensors within the multi-function control switch may work in concert to better determine the occupancy of a room. Conventional multi-function control switches having these sensing functions generally require at least one additional method of activation and indication of status, further increasing the complexity of the switch for the user.

Multi-function control switches which are capable of providing such additional operating functions as indicated herein risk being perceived as overly-complicated devices which intimidate a new, casual or technologically-timid user. In many situations, there is only one user in a household or office who is comfortable with such an advanced multi-function control switch, while the remaining occupants tend to avoid the use of anything but the most rudimentary functions of the device. Furthermore, inasmuch as these devices are life-long elements of a home or building, and inasmuch as the occupants may change from time to time, multi-function control switches which are neither complicated nor requiring of ongoing service by the user are more desirable.

SUMMARY OF THE INVENTION

The present invention provides a user-friendly, maintenance-free multi-function control switch which can be conveniently and inexpensively mounted in a standard wall junction box. No additional structure or components need be installed in the room when using this system. The system is designed to support a sophisticated array of features which may be triggered through the use of a single controller.

Beyond basic "power on" and "power off" functions, the multi-function control switch of the present invention includes several other operating functions, such as a dimming adjustment function, a delayed off function, a record function, a replay function, an overload-handling function, a power-failure handling function, and a sensor-activation function. Indeed, the multi-function control switch is capable of simultaneously performing multiple operating functions. Any operating function which is currently being performed is referred to as a current operating function.

The multi-function control switch incorporates easy-to-learn and intuitive keying sequences which can be input into the system with a conventional rocker-type actuator arm. A keying action is a single, sequential or combinational pressing and releasing actions performed by the user on either end of the rocker actuator arm, and/or on the auxiliary switches. If the keying action is recognized as being one of a predetermined set of keying sequences, it is accepted as being a valid keying sequence. Some keying actions may not be valid keying sequences, and are therefore ignored. By using the various aforesaid means in a careful design, the multi-function control switch allows many different operating functions to be controlled via a single ordinary-looking rocker actuating arm. Indeed, most commands may be selected by depressing the appropriate ends of the rocker actuating arm in various keying combinations. These combinations are similar to those of a computer "mouse" device.

The multi-function control switch also includes an electronic operating module which contains a control logic circuit. The control logic circuit provides overall electronic control of other component elements of the multi-function control switch. The control logic circuit interprets signals from the rocker-type actuator arm and sensors, and executes command logic elements associated with the input keying sequence.

The multi-function control switch also includes one or more indicator lamps to signal to a user the status of certain operating functions. The indicator lamps may be adapted to be illuminated in different visibly unique ways to indicate which operating function is engaged. The indicator lamps may extend through the face of the rocker actuating arm or may be covered by a partially translucent panel mounted in the face of the rocker actuating arm or a partially translucent section of the rocker arm itself. A symbol or other graphic icon is provided on either the face of the rocker actuating arm or on the partially translucent panel to indicate the specific operating function with which the lamp is associated. Certain colors of indicator lamps may also be used to add significance to the fact that the indicator lamp is illuminated (i.e., red for "off" and green for "on").

Accordingly, the multi-function control switch of the present invention provides a control for electrical lamps and other electrical appliances, where a rocker-type actuator arm can be used to execute a variety of operating functions. The multi-function control switch houses the actuator arm, the electronic operating module and momentary switches to electrically connect the actuator arm to the operating module. The multi-function control switch allows the user to control many basic as well as sophisticated operating functions through the use of a single familiar-looking wall-switch, and provides the user with an indication of its activities in a manner which is easily understood, and which is comfortable to unsophisticated users.

Additionally, the present invention may include a variety of sensors such as infrared proximity sensors, illumination-level sensors, sound sensors, current sensors, voltage sensors, all of which have small physical size and low power consumption. The present invention also includes a current overload sensor that will trigger the switch to automatically shut down the supply of power if a current overload is sensed. This saves the user from having to replace the entire switch or to manually replace a fuse in the switch in the event that the switch becomes overloaded.

The present invention also includes a power failure sensor which can sense a power failure to the system and cause the multi-function control switch to greatly reduce its own power consumption in order to operate off a small non-serviced power reservoir for the duration of the power failure. By doing so, the multi-function control switch saves user preferences and commands stored in its memory for the duration of a short power failure.

This power failure sensor is also capable of determining if the power failure is due to the user activating an air-gap switch, as opposed to a power failure which is caused by other external situations. If the user has activated the air-gap switch, the system will actively reset and erase the user preferences stored in its memory. The power failure sensor eliminates the need for a separate reset switch or switch position. The air-gap switch is a mandatory part of the design of all multi-function control switches, and thus in the present invention, the mandatory air-gap switch also functions as a reset switch, thereby lowering the cost overhead of the design.

Thus, the present invention provides a multi-function control switch which may be mounted in a standard junction box, and which provides a multiplicity of control or switch functions for lamps or other electrically operating and controllable apparatus or appliances connected thereto. Additionally, the multi-function control switch provides sophisticated functionality through a familiar, user-friendly control switch, which minimizes the need for user-servicing during its life time, and which enhances the safety and security of the user.

BRIEF DESCRIPTION OF THE FIGURES

The foregoing and other features and advantages of the invention will be apparent from the following, more particular description of a preferred embodiment of the invention, as illustrated in the accompanying drawings.

DETAILED DESCRIPTION OF THE PREFERRED EMBODIMENTS

An embodiment of the present invention is now described with reference to the figures where like reference numbers indicate identical or functionally similar elements. Also in the figures, the left most digit of each reference number corresponds to the figure in which the reference number is first used. While specific configurations and arrangements are discussed, it should be understood that this is done for illustrative purposes only. A person skilled in the relevant art will recognize that other configurations and arrangements can be used without departing from the spirit and scope of the invention. It will be apparent to a person skilled in the relevant art that this invention can also be employed in a variety of other devices and applications.

Figure 1:
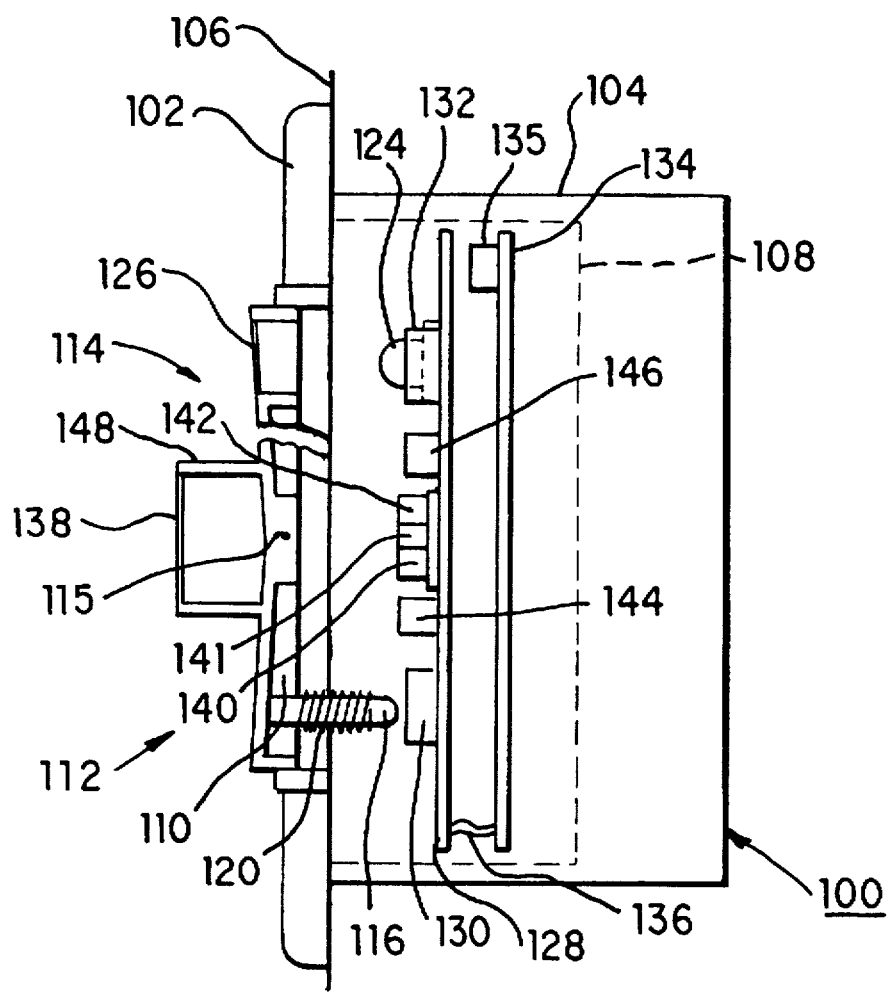
FIG. 1 is a side elevation sectional view of a multi-function control switch, taken along line 1—1 of FIG. 2.

FIG. 1 is a side elevation sectional view of a multi-function control switch 100. Multi-function control switch 100 can be conveniently and inexpensively mounted in a standard wall junction box 104 in keeping with prevailing electrical codes. No additional structure or components need be installed in the room when using this system. A panel 102 covers standard wall junction box 104 disposed within a wall 106. The features (described below) of multi-function control switch 100 are contained within a frame 108. A rocker actuating arm 110 projects through panel 102. Rocker-type wall switches often have a much larger actuating arm face which protrudes less from the wall than a standard toggle-type switch, and thus provide a more aesthetically pleasing system for the user. The present invention uses a three-position rocker-type actuating arm which has two momentary operating positions and a neutral position. In the preferred embodiment, a standard Contempra three position rocker-type actuating arm is used for rocker actuating arm 110. A Contempra switch is a conventional flat-paddled actuating arm available under many brand names. In alternate embodiments, a three position toggle switch or two push buttons could be used in place of rocker actuating arm 110. In another alternate embodiment, a two position switch could be used.

Rocker actuating arm 110 has a first end 112 and a second end 114. Rocker actuating arm 110 has a first operating position, a second operating position and a neutral resting position. Thus, when a user presses either first end 112 or second end 114 of rocker actuating arm 110, the arm rotates momentarily about a central axis 115 and into an operating position. When the user releases rocker actuating arm 110, a spring (described in further detail below) returns it to its neutral operating position.

Plungers 116, 118 (plunger 118 not visible in FIG. 1) are disposed behind first end 112 and second end 114, respectively. Plungers 116, 118 are surrounded by springs 120, 122, respectively (spring 122 not visible in FIG. 1). An indicator lamp 124 is shown mounted on a circuit board (discussed in further detail below) behind second end 114 of rocker actuating arm 110. In the preferred embodiment, indicator lamp 124 is a light emitting diode (LED). Indicator lamp 124 is visible through rocker actuating arm 110 by means of a shine-through window 126. In this embodiment, shine-through window 126 is formed using a translucent lens which covers indicator lamp 124. Shine-through window 126 could also be formed by having indicator lamp 124 extend through rocker actuating arm 110 or by using a thin-walled actuator with indicator lamp 124 behind it. A symbol or other graphic icon (see FIG. 2) may be provided on either the face of rocker actuating arm 110 or on the translucent lens to indicate the specific operating function with which the lamp is associated. Different colors may be used in the indicator lamps to indicate the status of the system (i.e., red for "off" and green for "on").

Multi-function control switch 100 includes two circuit boards 128 and 134 disposed within frame 108. Circuit boards 128 and 134 contain electronic components which comprise an electronic operating module. The electronic operating module includes various signaling switches, sensors, solid-state electronic power switches, power converters, indicator lamps, interface circuits, and control logic.

Circuit board 128 is a low powered circuit board. A first micro switch 130 is fixedly mounted on low power circuit board 128 so that when a user presses first end 112 of rocker actuating arm 110, plunger 116 makes contact with micro-switch 130. This momentary contact generates a signal which is sent via a path (not shown) on printed circuit board 128 to the operating module. A second micro switch 132 is fixedly mounted on low power circuit board 128 so that when a user presses second end 114 of rocker actuating arm 110, plunger 118 makes contact with second micro-switch 132. In the preferred embodiment, micro-switches 130 and 132 are momentary electrical single-pole single-throw switches with which a user can select, initiate, or program certain operating functions in the electronic operating module. A momentary contact is produced, when pressing rocker actuating arm 110, which activates plungers 118, 120 and micro-switches 130, 132. The signaling switch sends a signal to the electronic operating module. In the preferred embodiment, the electronic operating module also contains auxiliary signaling switches (either momentary or non-momentary) (shown in FIG. 6) which are also capable of generating signals to the electronic operating module.

Behind low power circuit board 128 is disposed a high power circuit board 134, which is also part of the electronic operating module. In another embodiment, one circuit board could be used to accommodate all the components of the electronic operating module. In the preferred embodiment, circuit boards 128 and 134 are approximately one inch apart. High power circuit board 134 is electrically connected to an alternating current power source (not shown) within wall junction box opening 104. A solid-state electronic power switch 135 is mounted on high power circuit board 134. Power from the alternating current power source is sent to solid-state electronic power switch 135, which controls the illumination of the lights. High power circuit board 134 is also connected via an inter-board connector 136 to low power circuit board 128. In the preferred embodiment, inter-board connector 136 is made using standard ribbon-cable. An inter-board connector could also be made from other simple wiring means known to a person skilled in the art.

Figure 2:
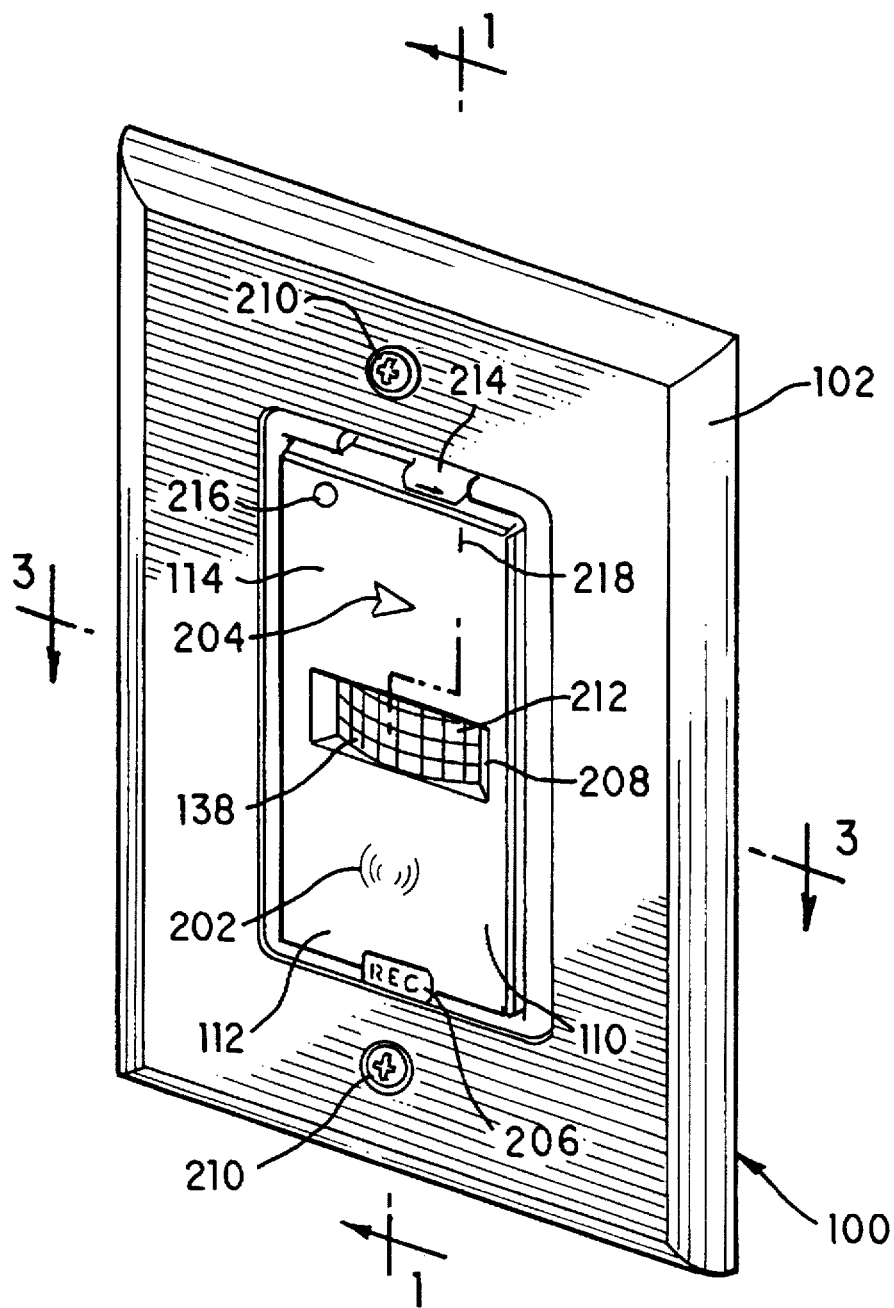
FIG. 2 is a front perspective view of the multi-function control switch in FIG. 1.
Figure 3:
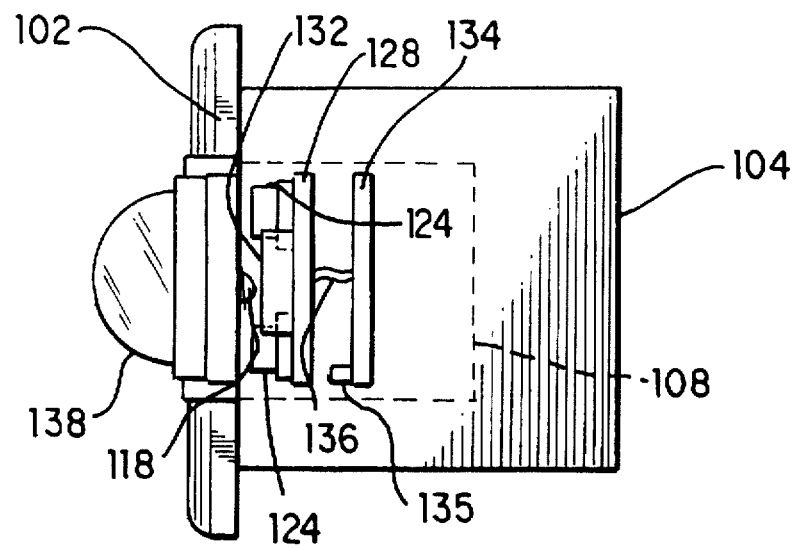
FIG. 3 is a top sectional view of the multi-function control switch, taken along line 3—3 in FIG. 2.

In FIGS. 1–3, a lens 138 is disposed in the center of rocker actuating arm 110. Lens 138 may have a substantially planar face (as shown in FIG. 1), a recessed spherical shape (as shown in FIG. 2), or a spherical shape (as shown in FIG. 3). Lens 138 is translucent to radiation in the infrared energy band and the visible energy band. In the preferred embodiment, lens 138 is made from polyethylene. As shown in FIG. 1, directly beneath lens 138, a passive infrared sensor 140, a sound sensor 141 and an ambient illumination-level sensor 142 are mounted on low power circuit board 128.

Passive infrared sensor 140 is capable of sensing through lens 138 the presence of a human body or other heat source when it is within the viewing radius and sensing range of the infrared sensor. In the preferred embodiment, the infrared sensors are dual-element pyroelectric infrared sensors, which have a sensing range of approximately twenty feet and a viewing radius of approximately 115°. Passive infrared sensor 140 can easily determine the occupancy of a room, because very often wall switches are located in a position that may be about chest high above the floor for a normal adult, and very often near a door or other entrance into a room. When the user activates passive infrared sensor 140, if it determines that the room is occupied, it will signal the multi-function control switch to either turn on the lights, or to keep the lights on for at least 10 minutes after the most recent detection of occupancy by the passive infrared sensor. In alternate embodiments, passive infrared sensor 140 could also be integrated into a burglar alarm system.

Sound sensor 141 can aid in determining the occupancy of a room based on sounds emanating from the room. Sound sensor 141 typically works in combination with passive infrared sensor 140 to assist in detecting occupancy. In the preferred embodiment, sound sensor 141 is an electret microphone.

Ambient illumination-level sensor 142 senses through lens 138 the level of illumination in the proximity of multi-function control switch 100, and adjusts or augments the illumination level automatically. In the preferred embodiment, ambient illumination-level sensor 142 is a photoconductive cell.

Other sensors are mounted on low power circuit board 128. In the preferred embodiment, low power circuit board 128 houses a voltage sensor 144, capable of sensing power failures, and a current overload sensor 146. In the preferred embodiment, voltage sensor 144 consists of a simple resistor network. Current overload sensor 146 consists of a window comparator.

In the preferred embodiment, if a power failure is detected, voltage sensor 144 signals the electronic operating module to conserve power and retain settings in its memory for a pre-determined period of time. In the preferred embodiment, the electronic operating module retains its memory-based settings for at least ten seconds, and until voltage sensor 144 determines that the power reservoir is below an acceptable level, at which point, it resets the system rather than risk corruption of the system due to random memory changes.

Voltage sensor 144 also signals the electronic operating module when the alternating current which powers the multi-function control switch crosses through the zero-voltage point. The alternating current crosses the zero-voltage point at a rate of either 100 or 120 times per second, depending upon the characteristics. 50 Hz or 60 Hz, respectively, of the national power grid. Thus, voltage sensor 144 is able to calculate the passage of time by continuously counting the zero-voltage point crossings.

Current overload sensor 146 sends a signal to the control logic circuit when current flow above a threshold amount has entered the system. The electronic operating module then shuts down power to the lighting system by inhibiting solid-state electronic power switch 135 in order to save the multi-function control switch from being destroyed. This "intelligent fuse" saves the user from having to replace the multi-function control switch or to manually replace a fuse located in the multi-function control switch.

FIG. 1 illustrates a projection 148 which houses lens 138. However, in the preferred embodiment (see FIG. 2), a non-protruding window is used through which passive infrared sensor 140 and ambient illumination-level sensor 142 detect conditions outside panel 102.

Figure 6:
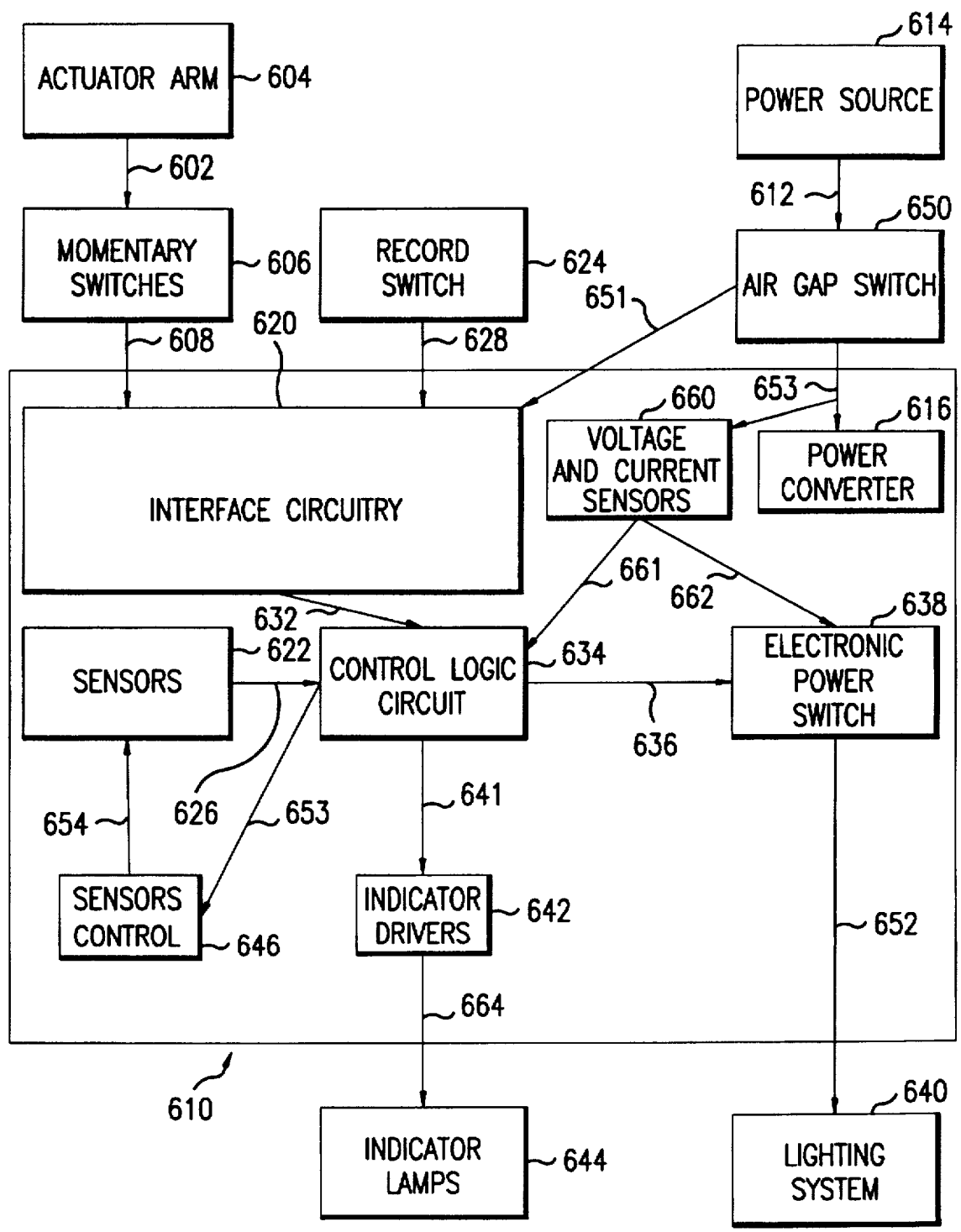
FIG. 6 is a high-level block diagram of the multi-function control switch.

Referring now to FIG. 6, a high-level block diagram of multi-function control switch 100 is shown. Multi-function control switch 100 includes an actuator arm 604 for entering keying sequences 602 into the switch. Input keying sequences 602 are mechanically sent to at least one of two momentary switches 606. Momentary switches 606 send electronic signals 608 to an electronic operating module 610. Also entering electronic operating module 610 is an alternating current 653 from an air-gap switch 650. Air-gap switch 650 receives alternating current 612 from a power source 614, normally available in a wall switch junction box. Electronic operating module 610 includes a power converter 616 which converts alternating current 653 into a form of power required by the electronic components of electronic operating module 610. The converted power (not shown in FIG. 6) is then sent from power converter 616 to all the electronic components of electronic operating module 610.

Electronic operating module 610 includes interface circuitry 620 which receives electronic signals 608 from momentary switches 606. Interface circuitry 620 also receives signals 628 from record switch 624 and signals 651 from air gap switch 650.

Interface circuitry 620 passes all of the signals 608, 628 and 651 as input 632 to a control logic circuit 634 that provides overall electronic control of component elements of the multi-function control switch. Thus, interface circuitry 620 makes control logic circuit 634 capable of receiving input signals from switches 606, 624 and 650. In the preferred embodiment, control logic circuit 634 is a solid-state microprocessor, such as a PIC series microprocessor, available from Microchip Technologies, Inc, Chandler, Ariz.

Also included in electronic operating module 610 are sensors 622, which include various electronic sensors for detecting physical motion, sound intensity, and light intensity. Sensors 622 pass electronic signals 626 to control logic circuit 634. Control logic circuit 634 is also capable of controlling sensors 622 by passing signals 653 through a sensor control circuit 646, which passes a signal 654 to sensors 622.

Also included in electronic operating module 610 are sensors 660 to detect voltage level, current flow level, and the passage of time. Sensors 660 generate signals 661 which are sent to control logic circuit 634. Sensors 660 also pass alternating current 662 to a solid-state electronic power switch 638 located in electronic operating module 610.

Control logic circuit 634 sends commands 636 to solid-state electronic power switch 638 to cause the switch to control a lighting system 640. Solid-state electronic power switch 638 selectably passes alternating current 652 through the multi-function control switch to lighting system 640.

Electronic operating module 610 also includes indicator drivers 642 to control indicator lamps 644. Control logic circuit 634 sends commands 641 to indicator drivers 642 to cause them to send a signal 664 which turns on or off indicator lamps 644.

Figure 7:
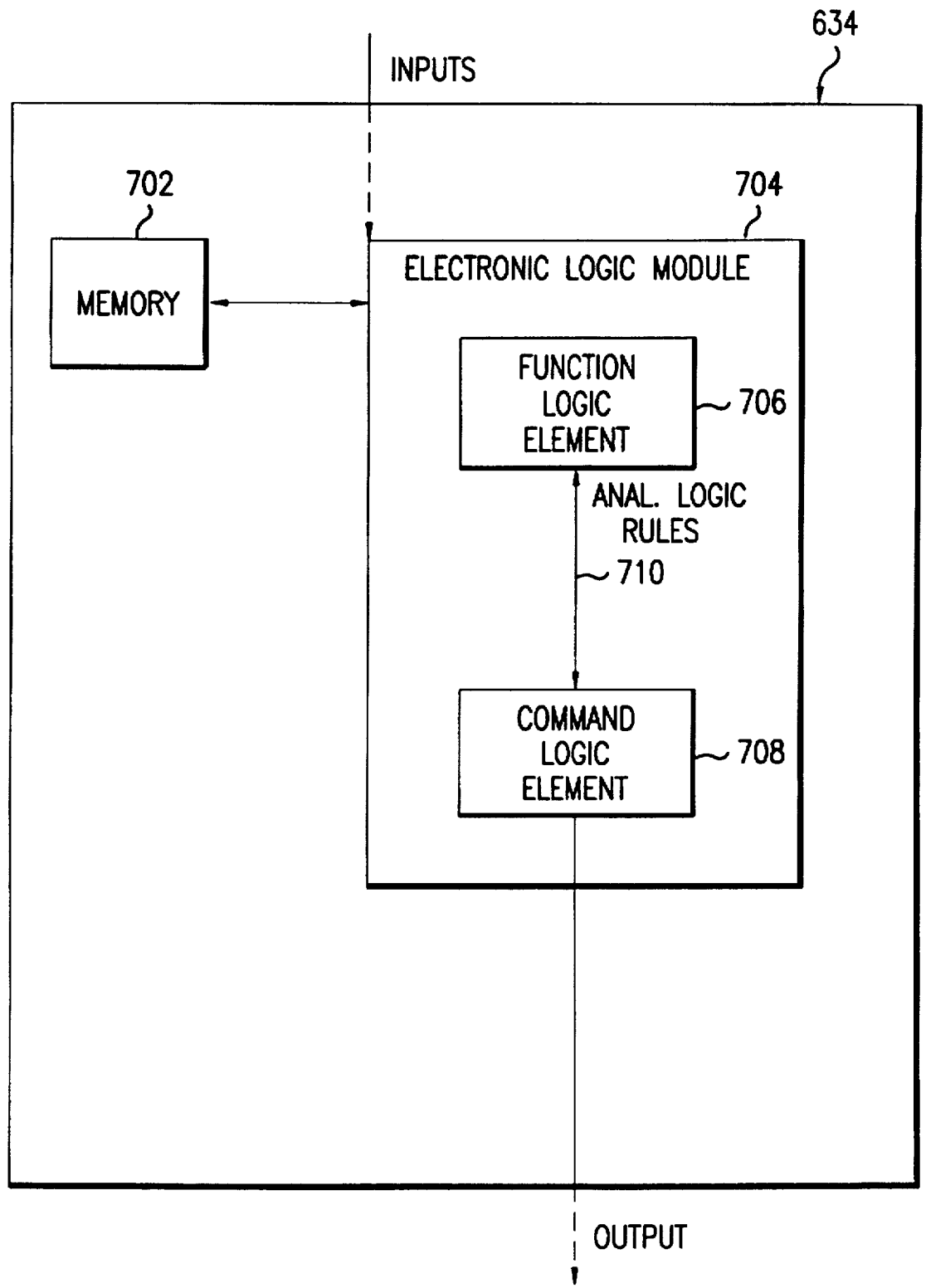
FIG. 7 is a block diagram of a control logic circuit disposed in the multi-function control switch.

Referring now to FIG. 7, control logic circuit 634 is further illustrated. Control logic circuit 634 receives inputs 632 through interface circuitry 620 from the electronic sensors and user input from the rocker actuating arm. These inputs are distributed to an electronic memory 702 and an electronic logic module 704. Electronic logic module 704 may contain hardware and/or software logic. Thus, control logic circuit 634 may be implemented as a microprocessor, or as a discrete hardware logic system, or as a combination of both.

Electronic logic module 704 includes function logic elements 706, which perform the detailed operations which comprise the individual operating functions of the multi-function control switch.

Further, electronic logic module 704 includes command logic elements 708, which use analysis logic rules 710 to associate input 632 from interface circuitry 620 with a particular function logic element 706. Command logic elements 708 initiate non-current operating functions, modify the operation of current operating functions, or terminate the operation of current operating functions. Command logic elements 708 which are associated with the current operating function are referred to as current command logic elements. If an association is found between a current command logic element and one or more keying sequences and/or sensor inputs, then the control logic causes the execution of the associated command logic element. If no such association is made, then input 632 is ignored.

In situations where there are multiple current operating functions and where there may appear to be more than one association between a particular input and a particular current command logic element, the analysis logic rules will always determine by way of prioritization or by way of design, a singular association between the input and one particular current command logic element.

Indeed, most commands may be selected by depressing the appropriate ends of the rocker actuating arm in various combinations. These combinations are similar to those of a computer "mouse" device. When the user depresses or releases an end of rocker actuating arm 110, this action is part of a keying action. A keying action is a single, sequential or combinational pressing and releasing actions performed by the user on either end of rocker actuating arm 110, and/or on the auxiliary switches. If the keying action is recognized by the analysis logic rules of the control logic, it is accepted as being a valid keying sequence. Some keying actions may not be valid keying sequences, and are therefore ignored. For example, in the preferred embodiment, one click on the top panel of the rocker actuating arm is a "keying sequence" which is recognized by the control logic as an "On" command. One click on the bottom panel of the rocker actuating arm is another "keying sequence" which is recognized by the control logic as an "Off" command.

Keying sequences can include, for example, pressing without releasing ("hold"), or pressing and releasing in rapid succession ("click"), or performing two clicks in rapid succession ("double click"). Rapid clicks mean only that the user does not pause longer than a specified, preset period of time between clicks (i.e., similar to a double-click on a computer "mouse"). In the preferred embodiment, the user must not pause longer than ¾ of a second between keying actions or the control logic circuit will presume that the keying action is not part of the keying sequence which is currently being analyzed. Thus, the system will interpret only those keying actions entered before the pause as being part of the current keying sequence.

Operating functions are modes of operation of the multi-function control switch. Examples include On, Off, Dimmer Adjustment, Record, Replay, Overload Handling, and Sensor modes. In some cases, more than one operating function may be operating at the same time, for example Dimmer Adjustment mode may take place while Replay mode is in effect. Operating functions which are currently in effect are referred to as current operating functions.

The following table describes examples of the various operating functions.

| Operating Function | Description |
| --- | --- |
| On | The solid-state electronic power switch allows current to pass through the switch to the lighting system. The effective amount of current which is provided is the amount which was set during the most recent dimmer adjustment function. No indicator lamp is affected by this operating function. |
| Off | The solid-state electronic power switch does not allow current to pass through the switch to the lighting system. No indicator lamp is affected by this operating function. |
| Overload Handling | Preempting the On function's control of the effective power output, the solid-state electronic power switch does not allow current to pass through the switch to the lighting system. Both indicator lamps cycle on and off alternately at 2 cycles per second, indicating an error condition. The unit requires a specific user action in order to re-enter On mode. |
| Power Fail Handling | The solid-state electronic power switch does not allow current to pass through the switch to the lighting system. All indicator lamps are extinguished. All power to sensor circuits are extinguished. The control logic circuit enters a very low power-consumption "sleep" mode for about 0.25 seconds, after which it resumes operation for about 0.01 seconds, during which time, power is re-supplied to the voltage sensor. If during said 0.01 seconds, the voltage sensor determines that full power is available, then power is again supplied to all sensors, and all previous operating functions resume. If, however, there is no power resumption, the control logic tests to see if there is still sufficient power to retain memory values consistently. If so, the control logic again extinguishes all power to the sensor circuitry, and resumes another iteration of the sleep and test cycle. If, however, the during the 0.01 second test period, power in the reservoir is determined to have fallen below critical limits, the memory elements of the control logic are reset, and the multi-function control switch is set to resume actions only upon the resumption of power. |
| Dimmer Adjustment | The user can direct the control logic to increase or decrease the effective amount of power which the solid-state electronic power switch allows to pass through the switch to the lighting system. The function adjusts the power within a designated maximum and minimum effective power range. Both indicator lamps cycle on and off alternately at 15 |

-continued

| Operating Function | Description |
|---|---|
| | cycles per second. If the operator does not enter any keying action for about three seconds, this operating function "times-out" and is extinguished. |
| Record | The multi-function control switch automatically and continuously records the state of the switch at various intervals during a 24 hour period. In the preferred embodiment, the multi-function control switch records the state of the switch every six minutes of the 24 hour period. The user can instruct the control logic circuit to override a recorded setting at a specific time of day. This override Record operating function is activated by the user depressing the Record button on the rocker actuator arm. The Record operating function remains active while keying action is entered. In the preferred embodiment, the user-induced change made to the multi-function control switch while in override Record mode is recorded into the memory of the control logic circuit, along with the effective time at which it occurred. During Record mode, the Replay indicator lamp is cycled on and off at a rate of one cycle every two seconds. |
| Replay | During Replay mode, the control logic circuit will alter the On, Off, or dimming level of the multi-function control switch, to the levels stored in the memory of the control logic circuit, at the same effective relative daily time as the various actions were recorded via the Record function, including specific settings stored by the user during Record mode. In the event that a full 24 hour period has not been recorded, the control logic circuit will play a pseudo-random pattern for the time period in the 24 hour period which does not have settings. |
| Sensor | In an embodiment of the multi-function control switch which contains sensors, as in the embodiment shown in FIGs. 1–3, the control logic circuit will continuously use the inputs from the passive infrared sensor, and the sound sensor, to determine whether or not the area adjacent to the sensors is occupied. If the sensor senses that the area is occupied, then the On function is initiated. If the sensor senses that the area is unoccupied, then for a period of about 10 minutes after the most recent time at which the control logic determined that the area was occupied, the control logic circuit will initiate the Off function. The control logic circuit also receives input from the ambient light sensor, which is used to determine if the lights should go on or off. |

Within the analysis logic rules in the control logic, each particular operating function has associated with it one or more command logic elements. The analysis logic rules are carefully designed so that when multiple operating functions are active concurrently, each keying sequence or sensor input has at most one unique association with a current command logic element. For example, when the current operating function is On, if the user depresses either end of rocker actuating arm 110 and holds it down for at least one second, this keying sequence is associated with a current command logic element which initiates Dimmer-Adjustment mode. However, the Dimmer-Adjustment operating function is active, the association of the same keying sequences to a current command logic element is redefined. Thus, continuing the same example, if the user subsequently holds down first end 112 while in Dimmer-Adjustment mode, a different current command logic element now causes the illumination of the lights to become steadily brighter.

The following table describes examples (in the preferred embodiment) of the association between the various input signals (i.e., keying sequences or sensor inputs) and the current command logic element of each operating function.

In this table, "lower" refers to actions on first end 112 of rocker actuating arm 110, and "upper" refers to actions on second end 114 of rocker actuating arm 110.

| Operating Function | Input Signal | Associated Command Logic Element |
|---|---|---|
| On | Lower click | End On, Initiate Off |
| | Upper hold | Initiate Dimmer-Adjustment |
| | Lower hold | Initiate Dimmer-Adjustment |
| | Upper double-click | Initiate Replay |
| | Lower double-click | Initiate Sensor |
| | Zero crossing detect | Increment time data by 1/120th of a second |
| | Current overload | End On, Initiate Overload-handling |
| | Power failure | Initiate Power fail handling. |
| | Reset (Air gap power switch) | Reset all control logic circuit memory |
| Off | Upper click | End Off, Initiate On |
| | Upper hold | Initiate Dimmer-Adjustment, Initiate On |
| | Upper double-click | Initiate Replay |
| | Lower double-click | Initiate Sensor |
| | Zero crossing detect | Increment time data by 1/120th of a second |
| | Current overload | End On, Initiate Overload-handling |
| | Power failure | Initiate Power fail handling |
| | Reset (Air gap power switch) | Reset all control logic memory |
| Overload Handling | Upper pressed | End Overload handling, initiate On |
| | Lower pressed | End Overload handling, initiate Off |
| Power Fail Handling | No power failure | End power failure handling |
| | Power reservoir low | Reset all memory, initiate Off |
| Dimmer-Adjustment | Upper pressed | Increase light intensity steadily while pressed |
| | Lower pressed | Decrease light intensity steadily while pressed |
| | (Idle for 3 seconds) | End Dimmer-Adjustment |
| Record | REC hold | Initiate Record |
| | (Idle for 5 seconds) | Record event (as defined previously), end Record |
| Replay | Upper double-click | End Replay |
| | (Current daily time matches the daily time at which an event was previously recorded) | As appropriate, initiate or end On and Off, and adjust the dimmer intensity as stored in control logic memory |
| Sensor | Lower double-click | End Sensor |
| | Passive Infrared (10 minutes since last passive infrared detection) | End Off, initiate On End On, initiate Off, set normal passive infrared sensitivity |
| | Sound detection | Increase passive infrared sensitivity |
| | Illumination detector high | Decrease dimmer intensity one step |
| | Illumination detector low | Increase dimmer intensity one step |

Referring now to FIG. 2, a front perspective view of multi-function control switch 100 is shown. Screws 210 are screwed through panel 102 and into frame 108 (not visible in FIG. 2) to secure panel 102 to frame 108. In FIG. 2, two icons are printed on rocker actuating arm 110. A sensor icon 202 is printed on shine-through window 126 of second end 114 of rocker actuating arm 110. The Sensor mode activates passive infrared sensor 140 and ambient illumination-level sensor 142 (not visible in FIG. 2). Indicator lamp 124 (not visible in FIG. 2) is disposed behind sensor icon 202 so that when signaled, indicator lamp 124 briefly illuminates sensor icon 202 to alert the user that the operating module has entered the Sensor mode. Indicator lamp 124 also illuminates sensor icon 202, during Sensor mode, if sensors 140, 142 detect the presence of a person. The indicator lamp, thus, reminds the user that the system is in Sensor mode.

A replay icon 204 is printed on another shine-through window 126 of first end 112 of rocker actuating arm 110. Replay icon 204 is illuminated to alert the user that the operating module has entered Replay mode. If the multi-function control switch has just been installed or a severe power outage has occurred, the memory of the operating module will be blank. In this case, when the user activates Replay mode, multi-function control switch 100 will play a pseudo-random pattern of use over each 24 hour period.

In the preferred embodiment, multi-function control switch 100 will automatically and continuously record in the memory of the operating module the status of the switch (or user settings) at time intervals during the most recent 24 hour period of use. Thus, if the user enters Replay mode twelve hours after a lengthy power failure, multi-function control switch 100 will play a pseudo-random pattern for the first twelve hours of the 24 hour period, and then will replay the last twelve hours of use as recorded in the memory of the operating module. The user may override the Replay mode at any time by entering a keying sequence. However, override does not cause multi-function control switch 100 to exit the Replay mode. For example, if during Replay mode the lights are off, the user could override the Replay mode by turning the lights on. However, the Replay mode will continue to replay settings in the control logic circuit until the user exits Replay mode by double clicking on the upper panel of rocker actuating arm 110.

In the preferred embodiment, the user may override the automatically recorded user settings by pressing a record button 206 to activate the Record mode. Record mode allows the user to record a custom setting at a specific time of day. When the user presses and holds record button 206 briefly, multi-function control switch 100 records, in the memory of the operating module, the next action performed by the user, and the relative time of day at which the action occurred. This custom setting will be saved in memory until a power failure occurs or the user resets the system. The automatic record function of the multi-function control switch does not override the custom settings. If no custom setting is entered within a predetermined period of time after entering Record mode, the Record mode will automatically end, and the multi-function control switch will return to automatically and continuously recording user settings at preset time intervals. While in Record mode, multi-function control switch 100 causes the LED behind replay icon 206 to blink to alert the user that the switch has entered Record mode.

In an alternate embodiment, when the user presses record button 206, record mode will be activated and will record every custom setting entered by the user until the user disengages record mode. Thus, each custom setting and the relative time of day at which it was entered will be recorded in the memory of the operating module.

When the user presses second end 114 of rocker actuating arm 110 twice, the switch enters Replay mode, and the most recent 24 hours of use, recorded in the memory of the operating module, and any custom actions previously recorded in the switch will be continuously performed by multi-function switch 100 at the same time of day that they were originally recorded.

In another embodiment, rocker actuating arm 110 could contain a variety of icons in addition to or instead of the icons shown in FIG. 2. For example, a dimmer icon may be located on rocker actuating arm 110 to alert the user that the operating module has entered a Dimmer-Adjustment mode. Dimmer-Adjustment mode allows the user to change the level of illumination of lights or lamps connected to the system. In the multi-function control switch of the present invention, the dimming function is controlled indirectly, by using a low powered signaling control, referred to herein as micro switches 130, 132, which indicates to the multi-function control switch's duty-cycle control circuit (not shown) the need to increase or decrease the duty cycle of the fast-operating solid-state switch. Thus, the solid-state switch turns on and off at various points during each cycle of the alternating current being fed to the lighting device. This controls the amount of electricity being fed to the light or lamp which effectively controls the intensity of the light emitted. In other embodiments, different icons, fewer icons, more icons, or no icons might be used.

A window 208 is cut out of rocker actuating arm 110 at its center. A non-protruding lens 212 is disposed within window 208. Passive infrared sensor 140, sound sensor 141 and ambient illumination-level sensor 142 (not visible in FIG. 2) are disposed behind lens 212. Multi-function control switch 100 also contains an auxiliary reset switch 214. Auxiliary reset switch 214 is slidably disposed between rocker actuating arm 110 and panel 102 so that the user can slide reset switch 214 between an "on" position denoted by "on" icon 216 and an "off" position denoted by an "off" icon 218. Settings recorded in the memory unit are reset when the user moves reset switch 214 from the "on" position to the "off" position and then moves it back to the "on" position. In the preferred embodiment, reset switch 214 also doubles as a manual shutoff or "air-gap" switch in case of an emergency. If the user enters Replay mode when there are no recorded events (e.g., the user resets multi-function control switch 100 and then enters Replay mode, or enters Replay mode after a lengthy power failure) multi-function control switch 100 will play a pseudo-random, preset on/off "security" pattern stored in it's memory, to make a house or office appear occupied to deter intruders. In the preferred embodiment, the pseudo-random pattern is a 24 hour pattern having varying intervals during which the lights turn on and off. In another embodiment, a completely random pattern can be used.

Additionally, in the event of a lengthy power failure such that the settings in the multi-function control switch have been reset, multi-function control switch 100 will automatically default to the security pattern once power is restored. In a second embodiment, multi-function control switch will wait a certain amount of time (e.g., twelve hours) after power is restored to enter the pseudo-random security pattern. Thus, if the power failure occurs while the occupants are asleep, they will not be awakened to lights turning on and off. However, if the power failure occurs while the occupants are away, the system still provides a security pattern to deter intruders.

Figure 4:
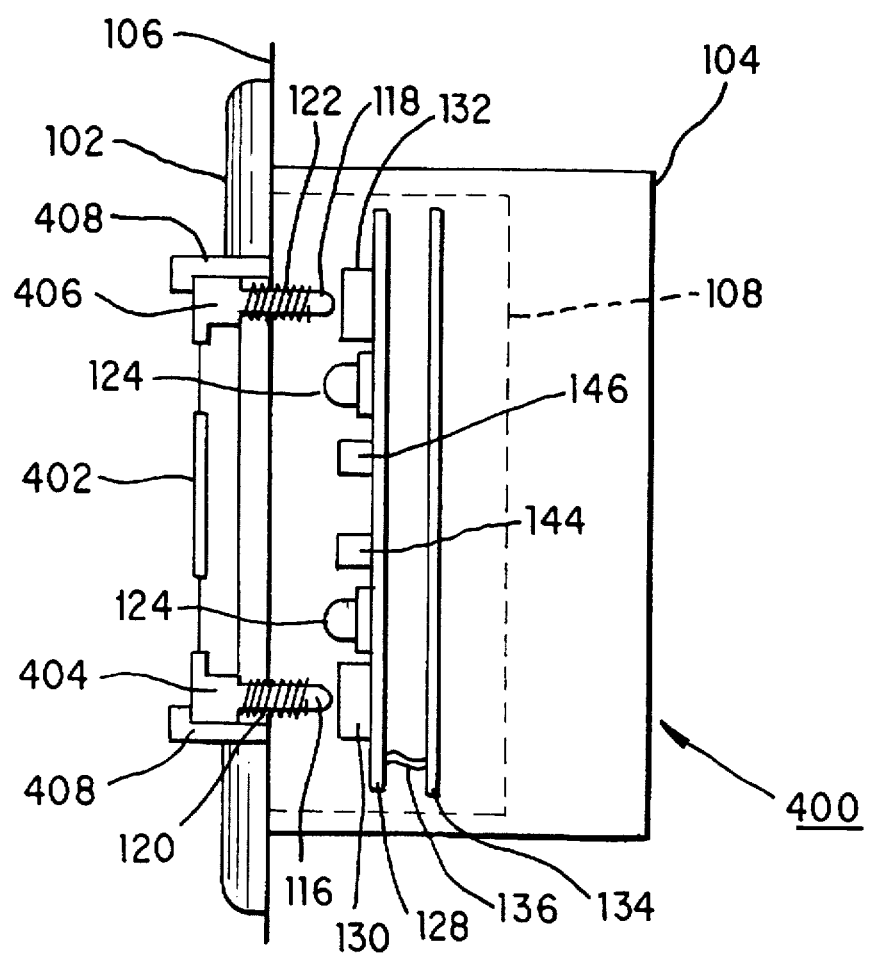
FIG. 4 is a side elevation sectional view of an alternate embodiment of a multi-function control switch.

FIG. 4 is a side elevation sectional view of an alternate embodiment of a multi-function control switch 400. An actuating arm 402 is shown disposed in panel 102 with two axes of rotation. Actuating arm has a first end 402 and a second end 404. Hinges 408, 408 secure actuating arm 402 in place. When the user presses actuating arm 402 at first end 404, first end 404 moves downward, and second end 406 is rotated upward. However, hinge 408 pins second end 406 in place so that actuating arm 402 rotates about a point located substantially at second end 406. When the user presses second end 406, the same rotation occurs about an axis located substantially at first end 404. Also shown in FIG. 4 are a pair of indicator lamps 124, 124 which shine directly through actuating arm 402.

Figure 5:
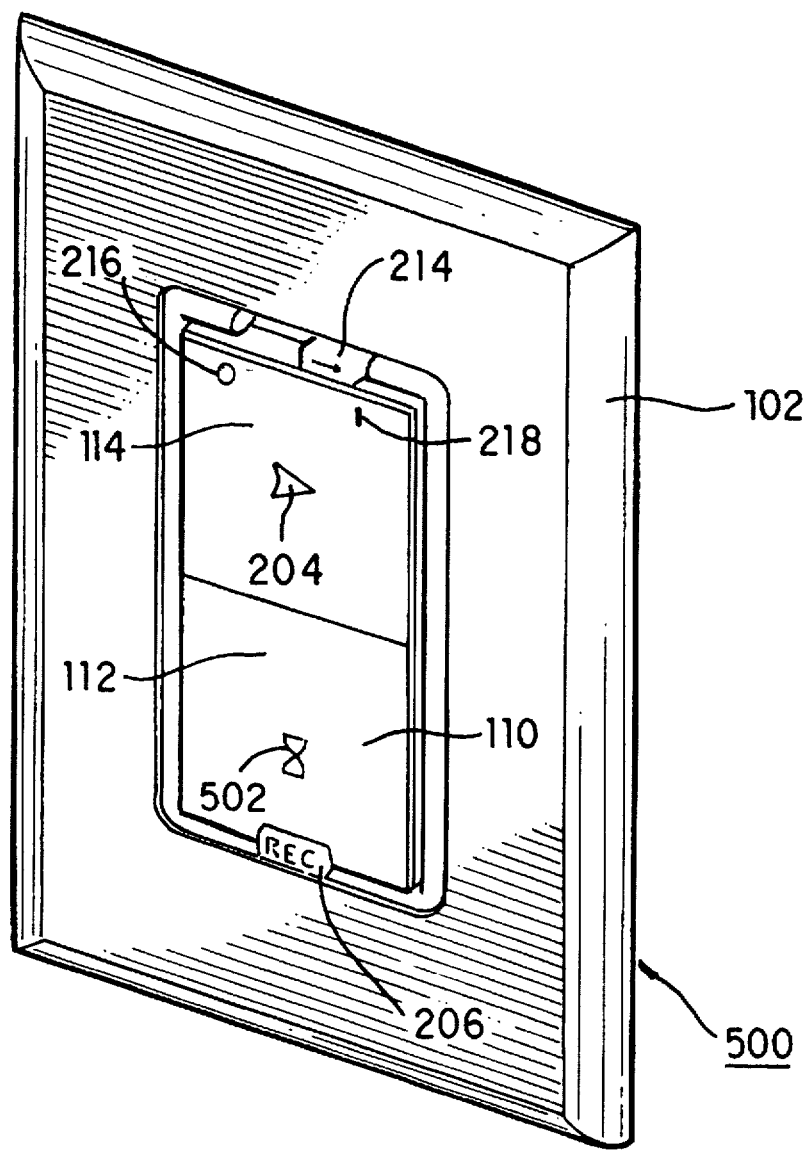
FIG. 5 is a front perspective view of an alternate embodiment of a multi-function control switch.

FIG. 5 is a front perspective view of an alternate embodiment of a multi-function control switch 500. This embodiment is made to appear like a conventional panel wall switch so that users who may be timid about using technologically-advanced devices will not be intimidated. Multi-function control switch 500 does not include the sensor functions of the preferred embodiment. It does, however, include reset switch 214, record button 206 and replay icon 204. In the place of sensor icon 202, multi-function control switch 500 has a time-out icon 502. Time-out icon 502 is illuminated to alert the user when the operating module has entered a Delay Off mode. To enter Delay Off mode, the user must double click on a first end 504 of a rocker actuator arm 506. Upon entering Delay Off mode, the LED behind time-out icon 502 blinks rapidly to alert the user that multi-function control switch 500 has entered the energy saving ten-second Delay Off mode. The operating module then signals the lights to shut off after a ten minute delay. Thus, Delay Off mode conserves energy by preventing the user from leaving lights on in an unoccupied room.

Figure 8:
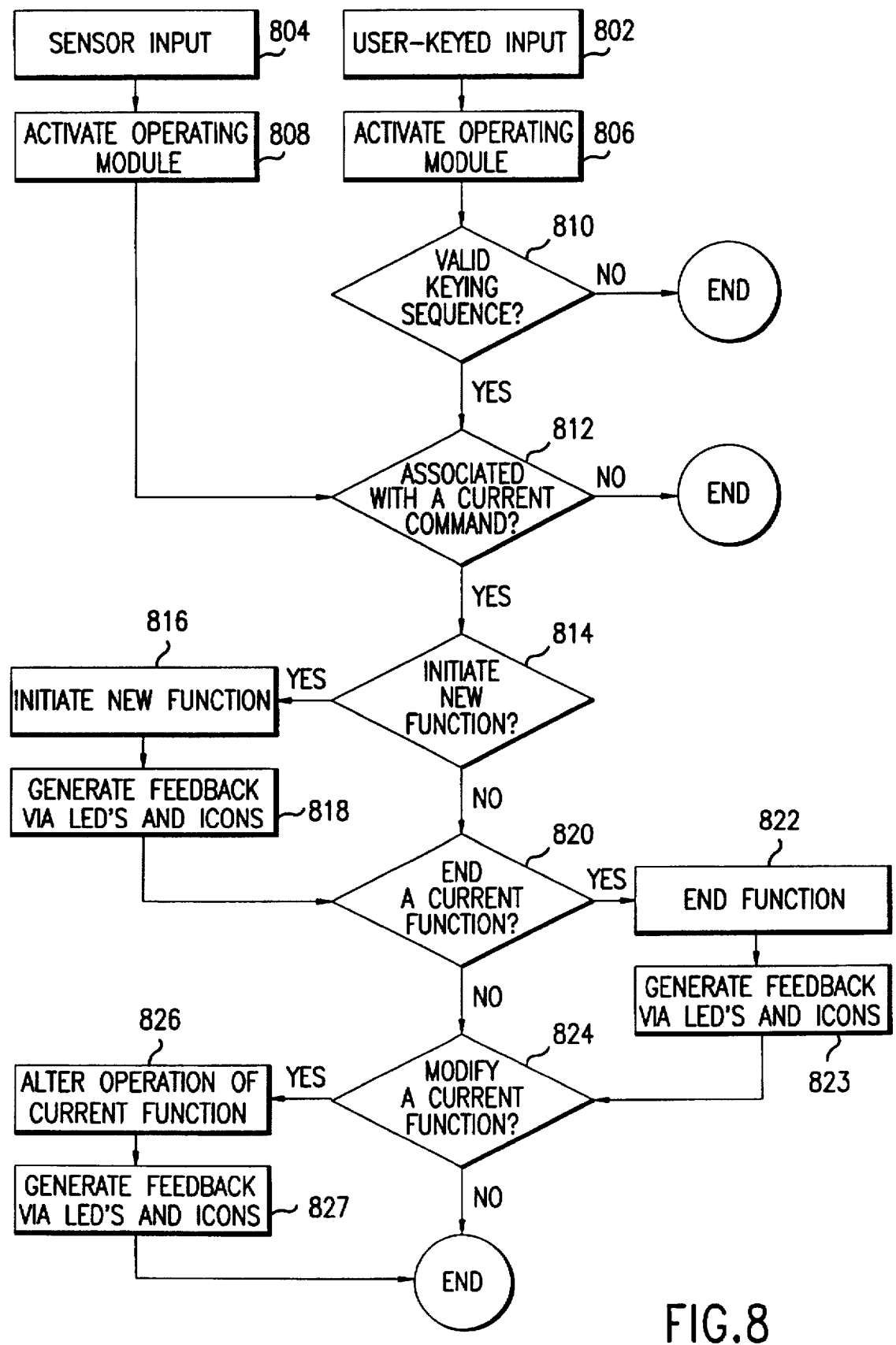
FIG. 8 is a flow chart of a multi-function control switch.

FIG. 8 is a flow chart of a multi-function control switch 800. Step 802 represents input in the form of input signals entered into system 800 via input keying sequences. These input keying sequences activate the control logic circuit, which uses its analysis logic rules to determine the appropriate reaction to the input keying sequence.

Using the analysis logic rules, at step 810, the control logic determines if the keying action entered by the user is a valid keying sequence; the control logic recognizes a plurality of preset keying sequences. Thus, in step 810, the control logic compares the keying sequence entered to those registered within its analysis logic rules. If no identical keying sequence is found, the control logic circuit will signal system 800 to "end" its analysis, and system 800 awaits further input. For example, if the user depressed both the REC button and the lower paddle concurrently, the control logic circuit would signal system 800 to "end" its analysis, because this is not a legitimate keying sequence. If the keying action entered matches one in the control logic circuit's memory, the system moves to step 812.

At step 812, the control logic determines if the keying sequence is associated with a command logic element of the current operating function. The control logic circuit examines the keying sequences associated with each currently running operating function, and determines if one of the keying sequences in its list of preset keying sequences is the same as the input keying sequence. If a match is found, the control logic circuit activates the command logic element associated with the input keying sequence. If there is no match, the control logic signals system 800 to "end" its analysis.

Referring back to step 804, step 804 represents input in the form of detection signals entered into system 800 via a sensor. Information concerning the passage of time is also included in step 804 because voltage sensor 144 can detect the passage of time via the zero-voltage point crossing.

At step 808, the arrival of sensor input causes the control logic circuit to begin analyzing the association of the sensor input to the current operating commands logic elements.

At step 812, the control logic circuit determines if the sensor input is associated with a command logic element of a current operating function. The control logic circuit examines the sensor inputs associated with each current operating function, and determines if one of the sensor inputs in it list of acceptable inputs matches the sensor input at 804. If a match is found, the control logic circuit activates the command logic element which is associated with the sensor input. If there is no match, the control logic circuit signals system 800 to "end" its analysis.

At step 814, if the command logic element which has been identified at step 812 requires a new operating function to be initiated, the control logic does so at step 816. The initiation of a new operating function will, in general, alter the list of preset keying sequences which are checked by the control logic at step 812. Next, at step 818, system 800 generates feedback to the user, typically via the LED's 124, to indicate that a new operating function has been initiated.

For example, in order to initiate Dimmer-Adjustment mode, the user depresses either end of rocker actuating arm 110 and holds it down for at least one second. Once the system is in Dimmer-Adjustment mode, the preset keying sequences are redefined, because a new function is operating. Thus, the same keying sequence (e.g. press and hold) will execute a command logic element which causes the lights to become steadily brighter if second end 114 is pressed, or steadily dimmer if first end 112 is pressed.

At step 820, the control logic circuit determines if the command logic element which has been identified at step 812 requires that a current operating function be terminated. If so, the control logic circuit ends the current operating function at step 822. The termination of the current operating function will, in general, affect the list of preset keying sequences which are checked by the control logic at step 812. Next, at step 823, system 800 generates the appropriate feedback to indicate to the user, typically via the LED's 124, that the current operating function has ended.

For example, if the current operating function includes Dimmer Adjustment mode, and if a keying sequence has not been received for a period of about three seconds, the Dimmer-Adjustment mode will "time-out" or end. Thus, when the sensor input shows the passage of a specific period of time, the operating module determines that the Dimmer-Adjustment mode should end, as shown in steps 822 and 823.

At step 824, the control logic circuit determines if the command logic element which has been identified at step 812 requires that a current operating function be modified. If so, the control logic modifies the current operating function at step 826. For example, the Dimmer-Adjustment mode is modified by increasing the intensity of illumination of the lights. The modification of an operating function will, in general, not affect the list of keying sequences which are checked by the control logic at step 812. Next, at step 827, system 800 generates the appropriate feedback to the user, typically via the LED's 124, to indicate that the current operating function has been modified, and then the control logic circuit signals system 800 to "end" its analysis. If at step 820, the control logic circuit determines that a current operating function need not be modified, then the control logic circuit signals system 800 to "end" its analysis.

The control logic circuitry in the operating module, required to do these tasks, can be created in either discrete electronic circuitry, monolithic custom integrated electronic circuitry, microprocessor-controlled software-logic circuitry, or combinations thereof. The availability of miniaturized components provides an easy means for mounting such components in a small and compact volume such as would be available beneath a conventional rocker-type actuating arm.

The present invention is not limited to lighting systems. The multi-function control switch of the present invention could be used for any electrically switch-operated system, including alarm systems.

While the invention has been particularly shown and described with reference to preferred embodiments thereof, it will be understood by those skilled in the art that various changes in form and details may be made therein without departing from the spirit and scope of the invention.

What is claimed is:

1. A multi-function control switch, comprising:
   means for inputting commands to the multi-function control switch, wherein at least three keying sequences can be input via said inputting means;
   a plurality of momentary switches, wherein input of each of said at least three keying sequences depresses and releases at least one of said plurality of momentary switches; and
   an electronic operating module disposed behind said inputting means said electronic operating module having
   a control logic circuit having means for performing and controlling a plurality of operating functions, wherein each of said plurality of operating functions is initiated, terminated and modified by a plurality of command logic elements within said control logic circuit, and wherein said plurality of operating functions include at least a dimming adjustment operating function, a record operating function and a replay operating function, and
   means, electrically connected to said control logic circuit for monitoring the passage of time.

2. The multi-function control switch of claim 1, wherein said means for inputting comprises a rocker-type actuator arm.

3. The multi-function control switch of claim 1, wherein said control logic circuit comprises:
   means for receiving an input keying action;
   an analysis logic rule stored within said control logic circuit, wherein said analysis logic rule determines whether said input keying action is a valid member of said at least three keying sequences, and whether said input keying action is associated with one of said plurality of command logic elements corresponding to one or more of said plurality of operating functions which is currently active; and
   means, disposed in said control logic circuit, for executing said command logic element.

4. The multi-function control switch of claim 1, wherein said multi-function control switch automatically monitors and records in said control logic circuit at least one user setting at preset time intervals during a 24 hour period and the relative time of day at which said at least one user setting was recorded.

5. The multi-function control switch of claim 3, wherein said record operating function, when in an active state, records in said control logic circuit the next input keying action as a custom setting and the relative time of day at which said custom setting was received, and wherein said custom setting overrides any of said user settings previously recorded in said control logic circuit at said relative time of day.

6. The multi-function control switch of claim 3, wherein said record operating function, when in an active state, records in said control logic circuit said input keying action as a user setting and the relative time of day at which said user setting was received.

7. The multi-function control switch of claim 3, further comprising an auxiliary switch, wherein said means for receiving said input keying action is configured to also receive input from said auxiliary switch.

8. The multi-function control switch of claim 7, wherein said auxiliary switch is a record switch which is used to activate said record operating function.

9. The multi-function control switch of claim 4, wherein said replay operating function, when in an active state, retrieves and executes each of said user settings when the time of day equals the relative time of day corresponding to said each of said user settings stored in said control logic circuit.

10. The multi-function control switch of claim 1, wherein said dimming adjustment operating function, when in an active state, increases and decreases the effective power output of the switch.

11. The multi-function control switch of claim 1, further comprising:
    means for mechanically interrupting the supply of said electrical power.

12. The multi-function control switch of claim 11, wherein said means for mechanically interrupting the supply of said electrical power is an air-gap switch, said air-gap switch being configured to signal said control logic circuit if said air-gap switch has been activated or deactivated, whereby said control logic circuit will reset said control logic circuit thereby erasing any of said keying sequences stored in said control logic circuit.

13. The multi-function control switch of claim 4, further comprising:
    a voltage level sensor, wherein said voltage level sensor senses a power failure within said power source; and
    a short-term power reservoir, wherein said short-term power reservoir is recharged during normal operations of the multi-function control switch, and provides a short-term power reserve for said electronic operating module when said voltage level sensor senses said power failure, and wherein said control logic circuit reduces the power consumed by said electronic operating module during said power failure to conserve said user setting stored in said control logic circuit for a predetermined period of time.

14. The multi-function control switch of claim 13, wherein said voltage level sensor issues a signal to said control logic circuit when the level of reserve power within said short-term power reservoir falls below a preset limit, thereby causing said control logic circuit to erase said at least one user setting stored in said control logic circuit and causing said electronic operating module to shut off.

15. The multi-function control switch of claim 1, wherein one of said operating functions is a time-out function, and wherein said time-out function, when in an active state, cuts off power to the switch after a preset amount of time.

16. The multi-function control switch of claim 1, further comprising:
    a current overload sensor, wherein said current overload sensor signals said control logic circuit to cut off power to the switch when said current overload sensor senses a current overload situation.

17. A multi-function control switch, comprising:
    a housing;
    means, disposed in said housing, for inputting commands to the multi-function control switch, wherein at least three keying sequences can be input via said inputting means;
    at least two momentary switches disposed behind said inputting means in said housing, wherein input of each of said at least three keying sequences depresses and releases at least one of said at least two momentary switches; and an electronic operating module disposed behind said inputting means in said housing, wherein said at least two momentary switches are disposed on said electronic operating module, said electronic operating module having a control logic circuit disposed in said housing, said control logic circuit having means for performing and controlling a plurality of operating functions, and wherein each of said plurality of operating functions is initiated, terminated and modified by a plurality of command logic elements within said control logic circuit, and wherein more than one of said plurality of operating functions may be currently active at any one time, means for sensing conditions within an area surrounding the multi-function control switch, wherein said means for sensing is electrically connected to said control logic circuit, means, electrically connected to said control logic circuit, for monitoring the passage of time, and means for indicating to a user the status of said plurality of operating functions of the multi-function control switch.

18. The multi-function control switch of claim 17, wherein said housing is configured to be mounted in a wall junction box, and wherein said wall junction box is electrically connected to a power source.

19. The multi-function control switch of claim 17, wherein said means for inputting comprises a rocker-type actuator arm.

20. The multi-function control switch of claim 17, wherein said control logic circuit comprises:

means for receiving an input keying action;

means for receiving sensor input from said means for sensing;

an analysis logic rule stored within said control logic circuit, wherein said analysis logic rule determines whether said input keying action is a valid member of said at least three keying sequences, and whether said input keying action or said sensor input are associated with one of said plurality of command logic elements corresponding to one or more of said plurality of operating functions which is currently active; and means, disposed in said control logic circuit, for executing said command logic element.

21. The multi-function control switch of claim 17, wherein said multi-function control switch automatically monitors and records in said control logic circuit at least one user setting at preset time intervals during a 24 hour period and the relative time of day at which said at least one user setting was recorded.

22. The multi-function control switch of claim 18, wherein one of said plurality of operating functions comprises a record operating function, and wherein said record operating function, when in an active state, records in said control logic circuit the next input keying action as a custom setting and the relative time of day at which said custom setting was received, and wherein said custom setting overrides any of said user settings previously recorded in said control logic circuit at said relative time of day.

23. The multi-function control switch of claim 18, wherein one of said plurality of operating functions comprises a record operating function, and wherein said record operating function, when in an active state, records in said control logic circuit said input keying action as a user setting and the relative time of day at which said user setting was received.

24. The multi-function control switch of claim 20, further comprising an auxiliary switch, wherein said means for receiving said input keying action is configured to also receive input from said auxiliary switch.

25. The multi-function control switch of claim 24, wherein said auxiliary switch is a record switch which is used to activate a record operating function.

26. The multi-function control switch of claim 21, wherein at least one of said plurality of operating functions is a replay operating function, and wherein said replay operating function, when in an active state, retrieves and executes each of said user settings when the time of day equals the relative time of day corresponding to each of said user settings stored in said control logic circuit.

27. The multi-function control switch of claim 17, wherein one of said plurality of operating functions is a dimming adjustment operating function, and wherein said dimming adjustment operating function, when in an active state, increases and decreases the effective power output of the switch.

28. The multi-function control switch of claim 21, further comprising:

a voltage level sensor, wherein said voltage level sensor senses a power failure within said power source;

a short-term power reservoir, wherein said short-term power reservoir is recharged during normal operations of the multi-function control switch, and provides a short-term power reserve for said electronic operating module when said voltage level sensor senses said power failure, and wherein said control logic circuit reduces the power consumed by said electronic operating module during said power failure to conserve any of said user settings stored in said control logic circuit for a predetermined period of time.

29. The multi-function control switch of claim 28, wherein said voltage level sensor issues a signal to said control logic circuit when the level of reserve power within said short-term power reservoir falls below a preset limit, thereby causing said control logic circuit to erase any of said user settings stored in said control logic circuit and causing said electronic operating module to shut off.

30. The multi-function control switch of claim 17, further comprising:

a current overload sensor, wherein said current overload sensor signals said control logic circuit to cut off power to the switch when said current overload sensor senses a current overload situation.

31. A multi-function control switch, comprising:

an actuating arm with a substantially planar face rotating about an axis, wherein said actuating arm has a first operating position, a second operating position and a neutral position, and wherein at least three keying sequences can be input via said actuating arm;

at least two momentary switches disposed behind said actuating arm, wherein input of each of said at least three keying sequences depresses and releases at least one of said at least two momentary switches; and an electronic operating module disposed behind said actuating arm, wherein said at least two momentary switches are disposed in said electronic operating module, said electronic operating module having a control logic circuit having means for performing and controlling a plurality of operating functions, and wherein each of said plurality of operating functions is initiated, terminated and modified by a plurality of command logic elements within said control logic circuit, and wherein more than one of said plurality of operating functions may be currently active at any one time, and means for sensing conditions within a predetermined area surrounding the multi-function control switch, wherein said means for sensing is electrically connected to said control logic circuit.

32. The multi-function control switch of claim 31, wherein said electronic operating module further comprises:

means, electrically connected to said control logic circuit, for monitoring the passage of time.

33. The multi-function control switch of claim 31, wherein said control logic circuit comprises:

means for receiving an input keying action;

means for receiving sensor input from said means for sensing;

an analysis logic rule stored within said control logic circuit, wherein said analysis logic rule determines whether said input keying action is a valid member of said at least three keying sequences, and whether said input keying action or said sensor input are associated with one of said plurality of command logic elements corresponding to one or more of said operating functions which is currently active; and means, disposed in said control logic circuit, for executing said command logic element.

34. The multi-function control switch of claim 31, wherein said multi-function control switch automatically monitors and records in said control logic circuit at least one user setting at preset time intervals during a 24 hour period and the relative time of day at which said at least one user setting was recorded.

35. The multi-function control switch of claim 33, wherein one of said plurality of operating functions comprises a record operating function, and wherein said record operating function, when in an active state, records in said control logic circuit said input keying action as a user setting and the relative time of day at which said user setting was received.

36. The multi-function control switch of claim 35, further comprising a record switch, wherein said means for receiving said input keying action is configured to also receive input from said record switch, and wherein said record switch is used to activate said record operating function.

37. The multi-function control switch of claim 33, wherein at least one of said plurality of operating functions is a replay operating function, and wherein said replay operating function, when in an active state, retrieves and executes each of said user settings when the time of day equals the relative time of day corresponding to each of said user settings stored in said control logic circuit.

38. The multi-function control switch of claim 31, wherein one of said plurality of operating functions is a dimming adjustment operating function, and wherein said dimming adjustment operating function, when in an active state, increases and decreases the effective power output of the switch.

39. The multi-function control switch of claim 33, further comprising:

a voltage level sensor, wherein said voltage level sensor senses a power failure within said power source;

a short-term power reservoir, wherein said short-term power reservoir is recharged during normal operations of the multi-function control switch, and provides a short-term power reserve for said electronic operating module when said voltage level sensor senses said power failure, and wherein said control logic circuit reduces the power consumed by said electronic operating module during said power failure to conserve any of said user settings stored in said control logic circuit for a predetermined period of time.

40. The multi-function control switch of claim 39, wherein said voltage level sensor issues a signal to said control logic circuit when the level of reserve power within said short-term power reservoir falls below a preset limit, thereby causing said control logic circuit to erase any of said user settings stored in said control logic circuit and causing said electronic operating module to shut off.

41. The multi-function control switch of claim 31, wherein one of said operating functions is a time-out function, and wherein said time-out function, when in an active state, cuts off power to the switch after a preset amount of time.

42. The multi-function control switch of claim 31, further comprising:

a current overload sensor, wherein said current overload sensor signals said control logic circuit to cut off power to the switch when said current overload sensor senses a current overload situation.

* * * * *